United States Patent [19]

Hindagolla et al.

[11] Patent Number: 5,026,425
[45] Date of Patent: Jun. 25, 1991

[54] WATERFASTNESS OF DB-168 INK BY CATION SUBSTITUTION

[75] Inventors: Suraj L. Hindagolla; Charles L. Thierheimer, Jr., both of Corvallis; John M. Skene, Lake Oswego, all of Oreg.

[73] Assignee: Hewlett-Packard Company, Palo Alto, Calif.

[21] Appl. No.: 449,654

[22] Filed: Dec. 11, 1989

[51] Int. Cl.$^5$ ............................................. C09D 11/02
[52] U.S. Cl. ......................................... 106/22; 106/20
[58] Field of Search ................................... 106/20, 22

[56] References Cited

U.S. PATENT DOCUMENTS

| | | | |
|---|---|---|---|
| 4,508,570 | 4/1985 | Fujii et al. | 106/22 |
| 4,620,876 | 11/1986 | Fujii et al. | 106/22 |
| 4,685,968 | 8/1987 | Palmer | 106/22 |
| 4,732,613 | 3/1988 | Shioya et al. | 106/22 |
| 4,734,489 | 3/1988 | Kawasaki et al. | 106/22 |
| 4,761,180 | 8/1988 | Askeland et al. | 106/22 |
| 4,767,459 | 8/1988 | Greenwood et al. | 106/22 |
| 4,786,327 | 11/1988 | Wenzel et al. | 106/22 |
| 4,793,860 | 12/1988 | Murakami et al. | 106/22 |
| 4,810,292 | 3/1989 | Palmer et al. | 106/22 |
| 4,853,037 | 8/1989 | Johnson et al. | 106/22 |

*Primary Examiner*—Mark L. Bell
*Assistant Examiner*—Helene Klemanski

[57] ABSTRACT

Inks for ink-jet printing containing Direct Black 168 dye have improved water resistance when the sodium cations on the dye are replaced with cations selected from the group consisting of ammonium, polyfunctional, and volatile amine cations.

16 Claims, No Drawings

WATERFASTNESS OF DB-168 INK BY CATION SUBSTITUTION

TECHNICAL FIELD

This invention relates to ink formulations for ink-jet printers, and, more particularly, to waterfast ink formulations, especially for thermal ink-jet printers.

BACKGROUND ART

Thermal ink-jet printers operate by employing a plurality of resistor elements to expel droplets of ink through an associated plurality of nozzles. In particular, each resistor element, which is typically a pad of resistive material measuring about 50 $\mu$m × 50 $\mu$m, is located in a chamber filled with ink supplied from an ink reservoir. A nozzle plate, comprising a plurality of nozzles, or openings, with each nozzle associated with a resistor element, defines part of the chamber. Upon energizing of a particular resistor element, a droplet of ink is expelled through the nozzle toward the print medium, whether paper, fabric, or the like. The firing of ink droplets is typically under the control of a microprocessor, the signals of which are conveyed by electrical traces to the resistor elements. By proper selection of the signals, alphanumeric and other characters are formed on the print medium.

The tight tolerances of the nozzles (typically 50 $\mu$m diameter) require that the ink not clog the nozzles. Further, repeated firings of the resistor elements, which must withstand about 10 million firings over the life of the ink cartridge, can result in fouling of the resistor element. Finally, the ink composition must be capable of interacting with the print medium, especially paper, to penetrate the paper without undue spreading, and they should be smear resistance and waterfast.

Inks are known which possess one or more of the foregoing properties. However, few ink compositions are known that possess all the foregoing properties, since an improvement in one property often results in the degradation of another property. Thus, many inks used commercially represent a compromise in an attempt to achieve an ink evidencing at least an adequate response in each of the foregoing considerations.

U.S. Pat. No. 4,767,549, issued to D. Greenwood et al, discloses and claims an ink for ink-jet printing, comprising a solution of C. I. Direct Black (DB) 168. DB-168 is a water-soluble anionic dye, and as available commercially, contains sodium counter-ions. The waterfastness of the sodium form of this dye has been found to be poor for ink-jet applications aimed at printing on common office papers.

Accordingly, investigations continue into developing ink formulations which have improved properties and which do not elevate one property at the expense of the others.

DISCLOSURE OF THE INVENTION

In accordance with the invention, the waterfastness of DB-168 is improved by cationic substitution of ammonium and alkyl amine ions. Inks in which these cations are substituted for sodium cations are more waterfast than inks formulated from dyes containing sodium, lithium, potassium, or tetramethylammonium (TMA) cations.

Any of the well-known cationic exchange processes, such as ion exchange using a resin column, reverse osmosis, and the like may be employed in the practice of the invention.

BEST MODES FOR CARRYING OUT THE INVENTION

DB-168 has three sulfonate groups; one sodium cation is associated with each such group. Thus, the maximum number of sodium cations that may be replaced on one dye molecule is three.

In accordance with the invention, the cations that may be used to replace sodium to provide an ink having improved waterfastness include ammonium ($NH_4^+$), polyfunctional amines such as diethylenetriamine (DTA), triethylenetetramine, and tetraethylenepentamine, and volatile amines, including the lower alkyl amines such as methyl amine and ethyl amine, and the lower dialkyl amines such as dimethyl amine and diethyl amine. For the purposes of this application, all such desirable cations, including ammonium cation, are termed "amines".

The ion exchange may be carried out by a number of processes, including use of ion exchange resin and reverse osmosis. In the case of ion exchange resin, a column is loaded with a cation exchange resin and is converted to the hydrogen form by passing a strong acid therethrough, such as concentrated hydrochloric acid. By monitoring the pH of the effluent, one can determine whether the resin is converted. The resin is then converted to the appropriate amine form by passing a basic form of the amine, such as the hydroxide. This loads the resin with the desired amine.

The dye, as commercially obtained, is passed through the column to replace the sodium cations with amine cations. Prior to this, the dye may be pre-purified to remove excess sodium, such as by reverse osmosis, employing well-known process conditions.

The column is then re-acidified to convert to the hydrogen form for conversion to the amine form and cycling additional sodium-dye therethrough. Determination of when the column is ready for re-acidification is simply done by periodically measuring the sodium content of the dye after passage through the column and comparing to a pre-set maximum allowed level, such as 500 or 1,000 ppm.

In an alternative procedure, the dye may be precipitated from water solution using a mineral acid as the precipitating agent, isolating the acidified dye, then neutralizing the dye with the appropriate amine base. In this manner, sodium ions are again replaced with the desired amine cations.

Finally, the well-known reverse osmosis process may be used to replace sodium cations with the desired amine cations. However, the conversion in this case may not be substantially 100%.

In any event, it is necessary to replace the sodium cations with the amine cations. Simple addition of amine cations in the form of an amine base would not result in the desired improved waterfastness, due to the presence of the sodium cations. Accordingly, it is desired that substantially all of the sodium cations associated with the DB-168 molecule be replaced with cations of one or more of the foregoing amines. However, partially substituted dye may also show sufficiently improved waterfastness characteristics to be useful.

The dye is then dissolved in a vehicle to make up the ink. Buffers for maintaining the pH, biocides, drying time improvers, and other compounds may be added to the ink, as is well-known in the art.

The vehicle comprises 0 to about 15% of a lactam, preferably about 5 to 15% of the lactam, and the balance water. The lactam preferably comprises at least one of N-(2-hydroxy ethyl)-2-pyrrolidone (NHEP), ranging from 0 to about 10%, N-methyl pyrrolidone, ranging from 0 to about 5%, and 2-pyrrolidone, ranging from 0 to about 15%. All amounts are in terms of weight percent, unless otherwise specified. The purity of all components is that employed in normal commercial practice.

The cation-substituted DB-168 ranges from about 0.5% to 10%, and preferably about 1% to 4%, of the total ink composition.

A preferred ink composition comprises a vehicle comprising about 10% of 2-pyrrolidone and the balance water. The dye concentration in the preferred ink composition is about 2%.

The inks of this invention have a pH range from about 5 to 9, preferably from about 6 to 8. Inks with the broad range of pH can be used with piezo-electric printers, but thermal ink-jet printers need the narrower range due to possible adverse interaction between the materials in the printhead and the ink. A buffer may be used to maintain the pH level. Among the useful buffers are ammonium acetate, 2-[N-morpholino] ethanesulfonic acid, or 3-[N-morpholino-]-2-hydroxypropane sulfonic acid; of these buffers, the second one (MOPSO) is the most preferred.

The biocides useful in this invention may be any one or more of the biocides that are commonly used with inks for thermal jet printers, for example, Proxel and Nuosept.

The ink of this invention has enhanced waterfastness. The waterfastness of a print sample is determined by measuring its initial $L^*$ coordinate. It is then placed in a beaker of water and washed for five minutes. After that time, it is dried and the $L^*$ coordinate is remeasured. The difference between the initial $L^*$ and the final $L^*$ is the $\Delta L$. A lower $\Delta L$ indicates improved waterfastness.

With suitable conductive additives, the formulations of this invention can be used for continuous ink-jet printers. Any non-corrosive, low toxicity, water-soluble salt may be used at a concentration from about 0.01 wt % to about 0.1%. Lower alkyl ammonium chlorides are typical examples.

INDUSTRIAL APPLICABILITY

The ink formulations of the present invention can be used wherever aqueous inks are employed and there is need for a water resistant print. They are, however, specifically designed to operate in a thermal ink-jet device, such as the DeskJet printer. DeskJet is a trademark of Hewlett-Packard Company.

EXAMPLES

Example 1

Two inks were prepared; the vehicles were varied, but the dye concentration in each ink was 2%. In one ink, the DB-168 dye was cation-exchanged with ammonium hydroxide on an acidified cationic exchange resin to replace the sodium ions with ammonium ions and in the other ink, the DB-168 dye was not cation-exchanged, leaving the sodium cation as the counter ion for comparative purposes.

500 ml of Dowex 50X8 cation exchange resin was converted to the acid (H.) form by passing 500 ml of 6N HCl over the resin over a period of about 1 hour. The resin was then rinsed with deionized water until column effluent had a pH of 6.0. 2500 ml of 1 wt % sodium form of DB-168 was then passed over the resin at a rate of about 20 ml per minute. The acid form of DB-186 was then collected and stored in the cold to prevent degradation.

The conversion of acid form dye to a particular counter ion was accomplished by neutralization with the particular free amine until the pH of the mixture was about 8.0. In the case where lithium, potassium, or other alkali metal counter ion was desired, neutralization with the corresponding hydroxide was done.

The concentrated dye in appropriate ion form was then diluted in a series of aqueous vehicles and used to print on office papers in a thermal ink-jet printer. Waterfastness of the printed characters was then measured.

TABLE I

| Loss of Darkness Upon Water Immersion. | | |
|---|---|---|
| Vehicle* NHEP–NMP | Ammonium $\Delta L$ | $Na^+$ $\Delta L$ |
| 0%–0% | 20.9 | 24.5 |
| 0%–2% | 12.7 | 16.7 |
| 5%–0% | 6.7 | 12.7 |
| 5%–2% | 5.3 | 9.8 |
| 5%–5% | 4.8 | 7.8 |
| 10%–0% | 4.4 | 9.7 |
| 10%–2% | 5.1 | 6.6 |
| 10%–5% | 4.0 | 7.6 |

*The balance of the vehicle was water.

Comparison of these values with the corresponding sodium form indicates the improvement in waterfastness afforded by the presence of the exchanged cation of the invention. Lower $\Delta L$ values indicates improved waterfastness results.

Example 2

A comparison was made for an ink as prepared in Example 1 with an ink prepared in Example 2 (ammonium cation exchange), using as the vehicle 10% 2-pyrrolidone (2P), balance water. The dye concentration was 2%. The water-fastness, as measured by $\Delta L$, is shown in Table II, below.

TABLE II

| Loss of Darkness upon Water Immersion. | |
|---|---|
| Solvent - Cation | $\Delta L$ |
| 10% 2P - Na | 4.2 |
| 10% 2P - $NH_4$ | 2.9 |

Again, the improvement in waterfastness employing an amine cation in accordance with the invention is evident.

Example 3

A variety of inks were prepared, each having a DB-168 concentration of 2 %, in a vehicle comprising 10 % 2-pyrrolidone, balance water. In each ink, the dye had been exchanged as in Example 1 to provide a series of dyes having different cations replacing the sodium cation. For comparison, an ink having the sodium cations intact was prepared. The dye transfer, in terms of mO.D. (optical density), was measured. The results are tabulated in Table III, below.

TABLE III

| Results of mO.D. for Various Cations Substituted for Sodium on DB-168. | |
|---|---|
| Cation | mO.D. |
| TMA+ | 420 |
| Na.+ | 400 |
| K.+ | 390 |
| Morpholinium | 380 |
| Li+ | 375 |
| $NH_4^+$ | 325 |
| DTA+ | 290 |

This tabulation illustrates the considerable improvement in waterfastness of cation-substituted DB-168 inks as measured by dye transfer numbers for the amines used in the ion-exchange of the invention; a lower mOD signifies improved waterfastness. Ammonium and diethylenetriamine are seen to be superior to other cations substituted for sodium.

Thus, there has been disclosed an improved ink employing DB-168, in which the sodium cation has been replaced. Such inks evidence improved waterfastness on office papers. It will be readily apparent to those skilled in the art that various changes and modifications of an obvious nature may be made without departing from the spirit of the invention. All such changes and modifications are considered to fall within the scope of the invention, as defined by the appended claims.

What is claimed is:

1. An ink suitable for ink-jet printing, comprising, by weight:
   (a) from about 5 % to about 15 % of a pyrrolidone selected from the group consisting of N-2-hydroxy ethyl)-2-pyrrolidone, N-methyl pyrrolidone, and 2-pyrrolidone and mixtures thereof,
   (b) from about 0.5 % to about 10 % DB-168 dye having cations associated therewith selected from the group consisting of ammonium, polyfunctional amine cations, and volatile amine cations, and
   (c) the balance water.

2. The ink of claim 1 wherein said volatile amine cations are selected from the group consisting of methyl amine, ethyl amine, dimethyl amine, and diethyl amine.

3. The ink of claim 1 wherein said polyfunctional amine cations are selected from the group consisting of diethylenetriamine, triethylenetetramine, and tetraethylenepentamine.

4. The ink of claim 1 which has been buffered to a pH from about 5 to 9.

5. The ink of claim 4 which has been buffered to a pH from about 6 to 8.

6. The ink of claim 5 which contains, as buffer, ammonium acetate, ammonium format, 2-[N-morpholino] ethane-sulfonic acid, or 3-[N-morpholino]-2-hydroxypropane sulfonic acid.

7. The ink of claim 1 which additionally contains a biocide.

8. The ink of claim 1 which additionally contains a non-corrosive, low toxicity, water-soluble salt.

9. The ink of claim 8 wherein said non-corrosive salt is a lower alkyl ammonium chloride.

10. The ink of claim 1 wherein said dye is present in a range from about 1% to 4%.

11. An ink suitable for ink-jet printing, comprising, by weight:
    (a) from about 5% to 15% of a pyrrolidone selected from the group consisting of N-(2-hydroxy ethyl)-2-pyrrolidone, N-methyl pyrrolidone, and 2-pyrrolidone and mixtures thereof,
    (b) from about 1% to 4% DB-168 dye having cations associated therewith selected from the group consisting of ammonium and diethylenetriamine,
    (c) a buffering agent to provide the ink with a pH from about 6 to 8, and
    (d) the balance water.

12. The ink of claim 11 wherein said buffering agent is selected from the group consisting of ammonium acetate, ammonium format, 2-[N-morpholino]-ethane-sulfonic acid, and 3-[N-morpholino]-2-hydroxypropane sulfonic acid.

13. A method for improving the waterfastness of an ink containing DB-168 dye comprising replacing substantially all first cations on said dye with second cations selected from the group consisting of ammonium, polyfunctional amine cations, and volatile amine cations.

14. The method of claim 13 wherein said volatile amine cations are selected from the group consisting of methyl amine, ethyl amine, dimethyl amine, and diethyl amine.

15. The method of claim 13 wherein said polyfunctional amine cations are selected from the group consisting of diethylenetriamine, triethylenetetramine, and tetraethylenepentamine.

16. The method of claim 13 wherein said second cations are selected from the group consisting of ammonium and diethylenetriamine.

* * * * *